United States Patent [19]

Beneteau et al.

[11] Patent Number: 4,736,486
[45] Date of Patent: Apr. 12, 1988

[54] CONNECTING DEVICE FOR A PANTOGRAPH WIPER ARM

[75] Inventors: Christian Beneteau, Gorcy, France; Alain Henrion, Saint-Mard, Belgium

[73] Assignee: Champion Spark Plug Europe S.A., Binche, Belgium

[21] Appl. No.: 891,591

[22] Filed: Aug. 1, 1986

[30] Foreign Application Priority Data

Aug. 19, 1985 [FR] France ................................ 85 12494

[51] Int. Cl.[4] .............................. A47L 1/02; B60S 1/40
[52] U.S. Cl. ................................. 15/250.23; 15/250.32
[58] Field of Search ........... 15/250.23, 250.21, 250.31, 15/250.32–250.42

[56] References Cited

U.S. PATENT DOCUMENTS

| | | |
|---|---|---|
| 3,076,991 | 2/1963 | McPherson . |
| 3,428,995 | 2/1969 | Pollock ............................ 15/250.23 |
| 3,548,442 | 12/1970 | Stratton . |
| 3,893,204 | 7/1975 | Kolb . |
| 4,535,500 | 8/1985 | Burton et al. . |
| 4,546,518 | 10/1985 | Harbison et al. ................. 15/250.23 |

FOREIGN PATENT DOCUMENTS

| | | |
|---|---|---|
| 18405 | 6/1984 | Fed. Rep. of Germany . |
| 244749 | 5/1947 | Switzerland ..................... 15/250.23 |
| 832466 | 4/1960 | United Kingdom . |
| 977607 | 12/1964 | United Kingdom . |
| 1140706 | 1/1969 | United Kingdom . |
| 1188311 | 4/1970 | United Kingdom . |
| 1234040 | 6/1971 | United Kingdom . |

*Primary Examiner*—Peter Feldman
*Attorney, Agent, or Firm*—Wood, Dalton, Phillips, Mason & Rowe

[57] ABSTRACT

A connecting device for a pantograph-type wiper system wherein the connecting device comprises an actuating arm, a first element for rotatably mounting a wiper blade to the actuating arm, a control arm and a second element for connecting the first element to the control arm. The second element is elongate and has at least a portion that is flexible so as to simulate the action of a ball-joint.

7 Claims, 4 Drawing Sheets

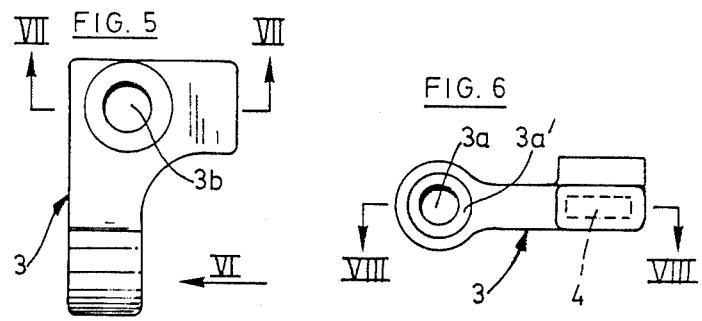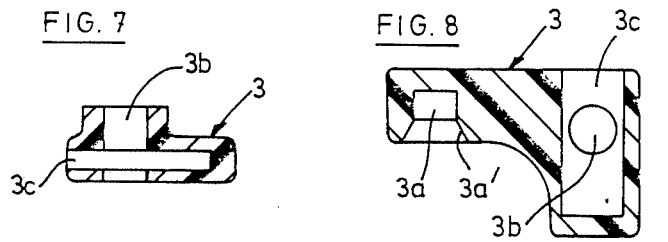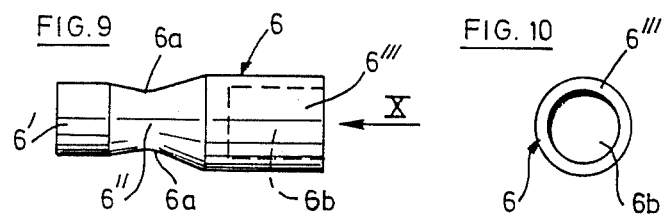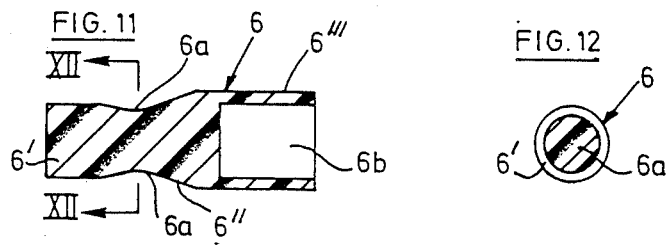

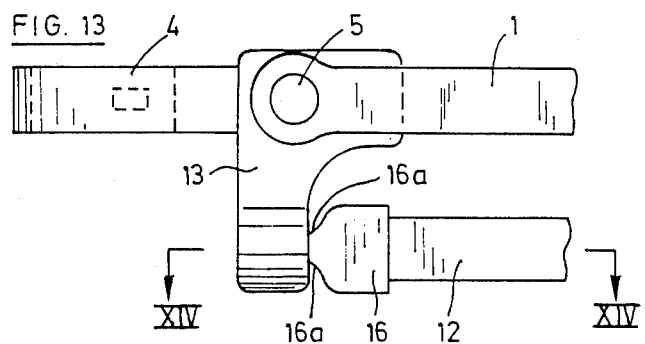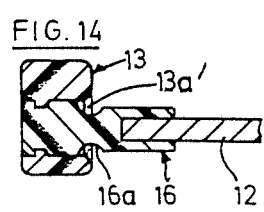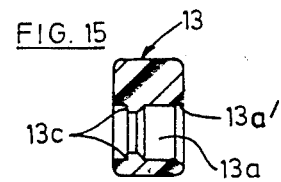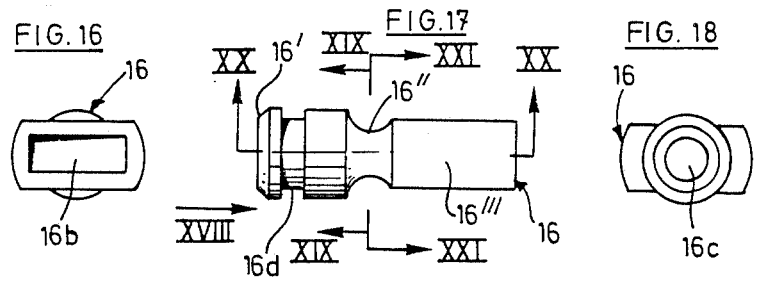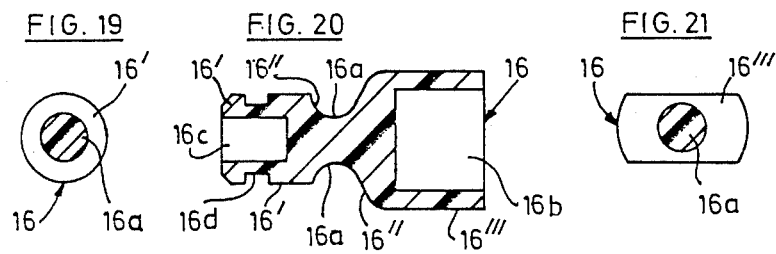

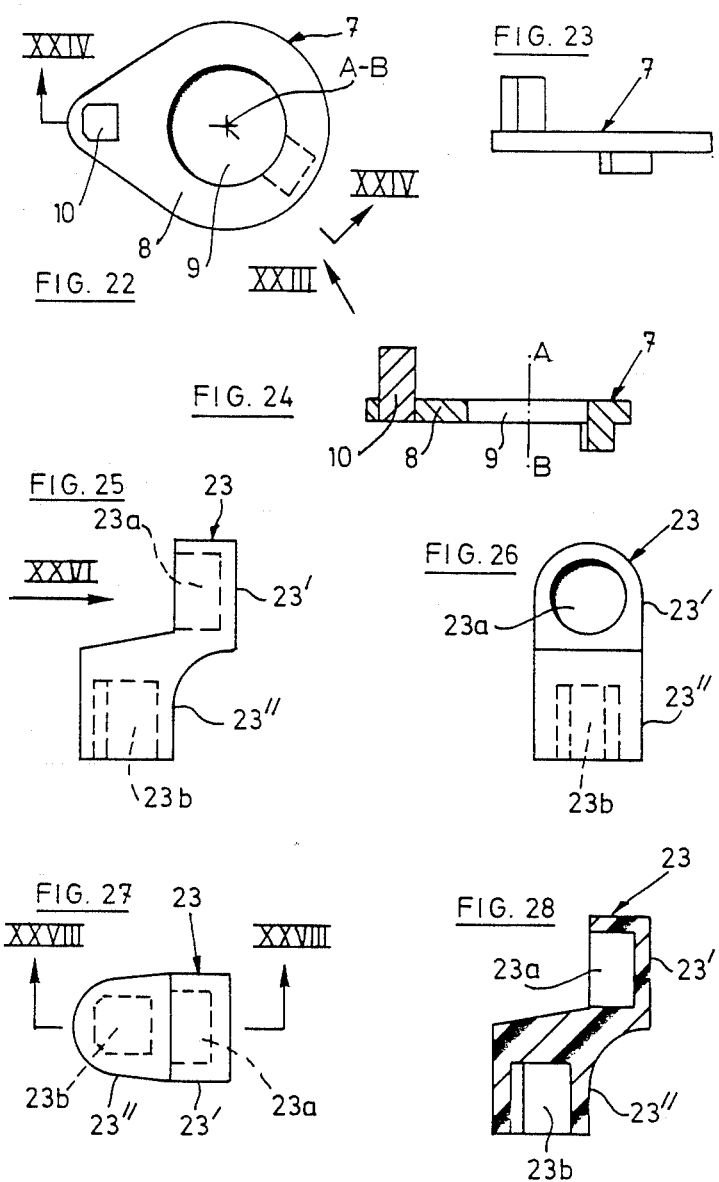

CONNECTING DEVICE FOR A PANTOGRAPH WIPER ARM

TECHNICAL FIELD

The present invention relates to a connecting device for a wiper system which connecting device comprises an actuating arm at a front end of which is rotatably attached a wiper blade by means of a first element and which connecting device further comprises a control arm of which a front end is also rotatably attached to said first element by means of a second element.

BACKGROUND ART

In the prior art the thus defined wiper systems are known as pantograph systems or, more commonly, as pantograph arms. U.S. Pat. No. 3,893,204 may be cited as an example of a prior art pantograph arm. In this patent said first element is represented by the reference numeral 20 and is, on one side, attached to the actuating arm by a first rivet and, on the other side, attached to the control arm by a second rivet. Said element 20 may rotate or swivel about the axes formed by said two rivets, which rivets are substantially perpendicular to a surface to be wiped.

Concerning the same U.S. patent it is to be noted that the control arm is attached to its driving mechanism in such a way that it may rotate or swivel about two axes which are substantially perpendicular, one with respect to the other, and of which one is substantially perpendicular to the surface to be wiped.

In said U.S. Pat. No. 3,893,204 and in the present invention said first element thus may rotate or swivel with respect to the control arm. Since said first element is moreover attached by conventional means to the superstructure of the wiper blade, the wiper blade may, under the action of the actuating arm, rotate or swivel with respect to the actuating arm about an axis which is substantially perpendicular to the surface to be wiped. This system, i.e. pantograph arms in general, makes it possible to increase the surface to be wiped by the wiper blade.

It is a known fact that the rivet connection between the control arm and said first element is a very unsatisfactory solution. Indeed the rivet and said first element are subject to torsion forces at each oscillating movement of the actuating arm and of the wiper blade, torsion forces which are due to the curvature of the surface to be wiped, i.e. generally the windshield of a motor vehicle. As a consequence said rivet connection is subject to rapid wear and the wipe quality will diminish with time.

In some know pantograph wiper arms the rivet which links the control arm to said first element has been replaced by a balljoint which, apparently, eliminates the above mentioned disadvantage. In fact even a ball-joint is subject to wear and said wear is not negligible if the ball-joint has not been carefully designed, in particular as to the materials used. Thus special materials must be used and the balljoint becomes rather complex and, consequently, relatively expensive.

It is to be noted that the two substantially perpendicular axes by which the control arm of the U.S. Pat. No. 3,893,204 is linked to its driving mechanism have also been replaced in some known pantograph arms by a ball-joint. The remarks made in the preceding paragraph also apply to this ball-joint.

DISCLOSURE OF THE INVENTION

The first object of the invention is to provide a pantograph wiper arm and, more particularly, a connecting device between the control arm and said first element which eliminates the above mentioned disadvantages of the known pantograph arms.

A second object of the invention is to simplify and to diminish the costs of the articulation or articulations between the control arm of a pantograph system and its driving mechanism.

The connecting device according to the invention is substantially characterized by the fact that said second element is made of a flexible material, that it has an elongate form and that in its central position it has a substantially circular cross-section.

A second characteristic of the connecting device according to the invention is the fact that said second element is made of an elastomer and preferably of a polyester elastomer.

A third characterstic of the invention is the fact that the rear end of the control arm is attached to its driving mechanism by means of an element which is identical with said second element.

BRIEF DESCRIPTION OF THE DRAWINGS

Other characteristics of the invention will be better understood when reading the following description of two embodiments in conjunction with the appended drawings, wherein:

FIG. 5 is a top view of a first element for rotatably attaching a wiper blade to an actuating arm according to the first embodiment of the invention;

FIG. 6 is a side elevational view in the line of arrow VI and turned clockwise by 90° of the first element represented on FIG. 5;

FIG. 7 is a sectional view along line VII—VII of FIG. 5;

FIG. 8 is a sectional view along line VIII—VIII of FIG. 6;

FIG. 9 is an enlarged top view of a second element for attaching a control arm to the first element according to the first embodiment of the invention;

FIG. 10 is a side elevational view in the line of arrow X of the second element represented on FIG. 9;

FIG. 11 is an axial sectional view of the second element represented in FIG. 9 and FIG. 10;

FIG. 12 is a sectional view along line XII—XII of th second element represented in FIG. 11;

FIG. 13 is a fragmentary top view of th front end of a pantograph arm according to a second embodiment of the invention;

FIG. 14 is a sectional view along line XIV—XIV of the pantograph arm of FIG. 13;

FIG. 15 is a sectional view of a first element for attaching a wiper blade to an actuating arm on the pantograph arm in FIG. 14;

FIG. 16 is a side elevational view in the line of arrow XVI, of the first element represented in FIG. 17;

FIG. 17 is an enlarged top view of a second element for attaching a control arm to the first element according to the second embodiment of the invention;

FIG. 18 is a side elevational view in the line of arrow XVIII of the second element represented in FIG. 17;

FIG. 19 is a sectional view along line XIX—XIX of FIG. 17;

FIG. 20 is a sectional view along line XX—XX of FIG. 17;

FIG. 21 is a section along line XXI—XXI of FIG. 17;

FIG. 22 is a top view of an element of the driving mechanism of the pantograph arm according to the invention;

FIG. 23 is a side elevational view in the line of arrow XXIII of FIG. 22;

FIG. 24 is a sectional view along line XXIV—XXIV of FIG. 22;

FIG. 25 is an enlarged side elevational view of a connecting element between said second element and the driving mechanism of the control arm of the pantograph system according to the invention;

FIG. 26 is a side elevational view in the line of arrow XXVI of the connecting element represented on FIG. 25.

FIG. 27 is a top view of the connecting element represented in FIG. 25; and

FIG. 28 is a sectional view along line XXVIII—XXVIII of FIG. 27.

BEST MODE FOR CARRYING OUT THE INVENTION

Figure 1:
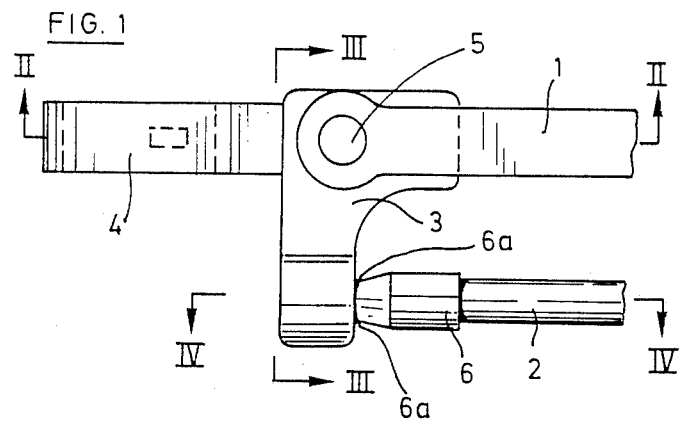
FIG. 1 is a fragmentary top view of the front end of a pantograph arm according to a first embodiment of th invention.

The front end of a pantograph arm according to the first embodiment of the invention (FIGS. 1 through 12) comprises: an actuating arm 1, a control arm 2, a first intermediate element 3 between the two arms 1, 2, a second intermediate element 6 between the two arms 1, 2, a hook 4 and a rivet 5.

The wiper blade (not shown) is attached to the hook 4 by means of an appropriate connector (not shown) and can rotate, or swivel, about the pivot formed by the rivet 5, under the action of the control arm 2 and via the intermediate elements 6 and 3. It is to be noted that when the actuating arm is working (oscillating movement) the control arm 2 is actuated by a driving mechanism of a type which is known in the prior art and which is part of the driving mechanism of the actuating arm 1.

Figure 2:
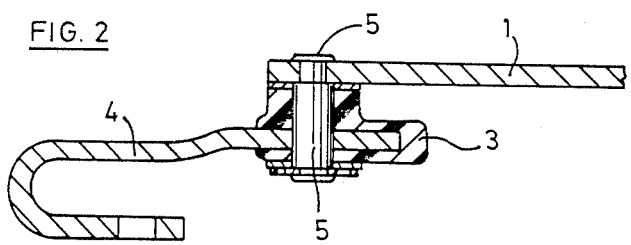
FIG. 2 is a sectional view along line II—II of the pantograph arm of FIG. 1.
Figure 3:
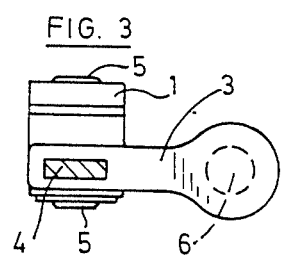
FIG. 3 is a sectional view along line III—III and turned counterclockwise by 90° of the pantograph arm of FIG. 1.

In FIGS. 2, 7 and 8 it can be seen that the rear end of the hook 4 is inserted into a cavity 3c of the element 3, which cavity has slightly larger dimensions than said rear end of the hook 4. It is the rivet 5 (FIG. 2) which retains the rear end of the hook 4 in the cavity 3c of the element 3.

Said first element 3 (FIGS. 5 through 8) is made of a relatively rigid plastic material and has substantially the general form of an L of which one of the bars is provided with the cavity 3c for receiving the rear end of the hook 4 and of which the other bar is provided with a cavity 3a into which is inserted the front end 6' (FIG. 9) of said second element 6 which in turn is attached to the front end of the control arm 2.

In FIGS. 5, 7 and 8 it can be seen that in the element 3 a cylindrical opening 3b is provided for inserting therein the rivet 5 about which said element 3, and consequently the hook 4, may rotate or swivel between the limits imposed on it by the control arm 2.

In the first embodiment of the invention FIGS. 1 through 12) the control arm 2 has the form of a cylindrical bar and that said second element 6, which links the control arm 2 to the element 3, also has substantially the general form of a cylinder. The cylindrical form of the element 6 is however not essential. Indeed its form can also be any other elongate form.

The element 6 is the most important element of the invention and constitutes in fact the connecting device according to the invention, i.e. it embodies the connection between the control arm 2 and the element 3. As already said above, the front end 6' (FIG. 9) of the element 6 is inserted into the cavity 3a of the element 3 and can, for example, be cemented therein. It is however to be noted that any other retention system can be used and, in particular, any snap-on system.

The front end of the control arm 2 is inserted into the cavity 6b of the rear end 6''' of said element 6 and is retained in said cavity in the same manner as is retained the front end 6' of the element 6 in the cavity 3a of the element 3, i.e. snap-on systems.

FIGS. 9 and 11 show that the central portion 6'' of the element 6 has a reduced cross section (6a) with respect to the front (6') and rear (6''') end of said same element 6. FIG. 12 shows moreover that said reduced cross section 6a has a circular form. Because the element 6 is, according to the invention, made of an elastomer, and preferably of a polyester elastomer, it can be easily seen that said central portion 6'', or the reduced cross section 6a, can not only act as a pivot, but also as a ball-joint, i.e. the control arm 2 may take different angular positions with respect to the element 3 in all directions.

The last mentioned feature is important since the torsion forces mentioned above are absorbed by the element 6 without producing the inevitable wear of parts in the pantograph systems known in the prior art. Moreover, a simple elastomer element replaces a relatively complex ball-joint. An appreciable reduction of costs is thus obtained.

Figure 4:
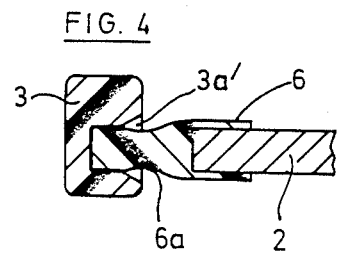
FIG. 4 is a sectional view along line IV—IV of the pantograph arm of FIG. 1.

In the case of the thus described first embodiment of the invention, FIGS. 4 and 8 show schematically that the angular movements of the control arm 2 may be limited by a widening 3a' (towards the control arm) of the cavity 3a of the element 3.

Just as for the first embodiment, the front end of the pantograph arm according to a second embodiment (FIGS. 13 through 21) of the invention comprises: an actuating arm 1, a control arm 12, a first intermediate element 13 between the two arms 1, 12, a second intermediate element 16 between the two arms 1, 12, a hook 4 and a rivet 5.

The connections between the actuating arm 1, the rivet 5, the first intermediate element 13 and the hook 4 are realized in exactly the same manner as in FIG. 1, i.e. as in the first embodiment of the invention. The same is true as to the way to work, i.e. as the elements the relative movements of these different elements, one with respect to the other, when the pantograph arm is working.

Just as before said first element 13 (FIGS. 13, 14 and 15) is made of a relatively rigid plastic material and has substantially the form of an L of which one of the bars is provided with a cavity for receiving the rear end of the hook 4 and of which the other bar is provided with an opening 13a into which is inserted the front end 16' (FIGS. 17 and 20) of said second element 16, which in turn is attached to the front end of the control arm 12.

In the present case the control arm 12 has a substantially rectangular cross section and the form of the rear end 16''' (FIGS. 17 and 20) of the element 16 has been modified accordingly. Just as in the first embodiment the front end of the control arm 12 is inserted into a cavity 16b (FIGS. 16 and 20) of the element 16 or is attached to said element 16 in any other way, including by means of a snap-on system.

The front end 16' (FIGS. 17 and 20) of the element 16 is inserted into the opening 13a (FIG. 15) of the element 13 and is retained therein by means of a snap-on system which comprises (a) in the opening 13b: an annular shoulder 13c and (b) on the front end 16' of the element 16: a corresponding annular recess 16d.

The central portion 16'' of the element 16 has a reduced circularly shaped cross section 16a, just as in the first embodiment and thus can function in the same manner as a ball-joint, with the advantages mentioned above, advantages which are essentially due to the fact that the element 16 is made of an elastomer and preferably of a polyester elastomer.

Just as before the angular movements of the control arm 12 may be limited by a widening 13a' (towards the control arm) of the opening 13a of the element 13. The snapping of the front end 16' of the element 16 into the opening 13a of the element 13 may be facilitated by providing said front portion 16' with a cavity 16c (FIGS. 18 and 20). Once the front end 16' of the element 16 has snapped into the opening 13a of the element 13 a stud of appropriate dimensions may be inserted into said cavity 16c, thus avoiding any accidental dislocation of the element 16.

FIGS. 22 through 24 schematically represent the driving mechanism of the control arm 2, 12. This mechanism is actuated by a drive shaft for the actuating arm 1, which drive shaft is represented in FIG. 22 and FIG. 24 by its geometrical axis A-B. The element 8 comprises a circular opening 9 through which passes the drive shaft of the actuating arm 1 and consequently of the control arm 2, 12. Eccentrically with respect to the axis A-B the element 8 is provided with a stud 10 which is perpendicular to the element 8. It is to this stud 10 that the rear end of the control arm 2, 12 will be attached by articulation means.

To this effect the element 23, represented in FIGS. 25 through 28, will be placed onto said stud or, in other words, the stud 10 will be inserted into the cavity 23b of the lower portion 23'' of said element 23 and will, for example, be cemented therein.

The upper portion of the element 23 is provided with a cavity 23a which has the same dimensions as the cavity 3a of the element 3 (FIG. 8) of the first embodiment of the invention and the articulation between the control arm 2 and the element 23 will be realized by an element whih is identical with the element 6 (FIGS. 9 through 12) of the first embodiment of the invention. In other words, the rear portion 6''' of the element 6 is attached to the rear end of the control arm 2 and the front end 6' of the element 6 is inserted into the cavity 23a of the element 23.

Between the rear end of the control arm 2 and the element 23 the element 6 will thus have the same function as in the first embodiment of the invention, i.e. it will function in the same manner as a ball-joint. It is moreover quite evident that the element 6 and the element 23 may be designed in such a way that they are linked together by means of a snap-on system similar to that of FIGS. 14 through 21.

Two preferred embodiments of the invention have thus been described. In taking into consideration the fact that one single element (6, 16) may be used at the front as well as at the rear end of the control arm 2, 12 to thereby replace ball-joints, it is easy to appreciate not only the simplicity of the proposed solution, but also the lower costs made possible by said solution.

We claim:

1. A connecting device for a wiper system, said connecting device comprising: an actuating arm (1) having a front end, a first element (3,13) for attaching a wiper blade to the front end of the actuating arm, said connecting device further comprising a second element (6,16), and a control arm (2, 12) having a front end which is fixedly attached to said second element (6, 16), which in turn is fixedly attached to said first element (3,13), said second element (6, 16) characterized in that said second element (6, 16) is made of a flexible material and said second element has an elongate form with a central portion (6'', 16''), said central portion having a substantially circular cross section which flexes to permit universal relative movement between the control arm (2,12) and first element (3,13).

2. A device according to claim 1, characterized in that in its central portion (6'', 16'') said second element (6, 16) has a cross-section (6a, 16a) substantially smaller than at its two extremities (6', 6''; 16', 16'').

3. A device according to claim 1 or 2, characterized in that said second element (16) is removably, fixedly attached to said first element (13) by a snap-on system (13c, 16d).

4. A device according to claim 1, characterized in that said second element (6, 16) is removably, fixedly attached to the front end of the conrol arm (2, 12) by a snap-on system.

5. A device according to claim 1, characterized in that the rear end of the control arm (2, 12) is attached to its driving mechanism (7) by means of an element which is identical with said second element (6, 16).

6. A device according to claim 1, characterized in that said second element (6, 16) is made of an elastomer.

7. A device according to claim 6, characterized in that said second element (6, 16) is made of a polyester elastomer.

* * * * *